United States Patent
Daniels

(12) 
(10) Patent No.: US 6,426,113 B1
(45) Date of Patent: Jul. 30, 2002

(54) AGRICULTURAL EXTRACTION PRODUCTS AND PROCESSES

(76) Inventor: Ralph S. Daniels, c/o Agrotech P.O. Box 1851 (401 N. Walnut St.), Sherman, TX (US) 75091-1851

( * ) Notice: Subject to any disclaimer, the term of this patent is extended or adjusted under 35 U.S.C. 154(b) by 0 days.

(21) Appl. No.: 09/023,320

(22) Filed: Feb. 13, 1998

Related U.S. Application Data

(60) Provisional application No. 60/037,761, filed on Feb. 13, 1997, provisional application No. 60/037,762, filed on Feb. 13, 1997, provisional application No. 60/037,763, filed on Feb. 13, 1997, provisional application No. 60/037,764, filed on Feb. 13, 1997, provisional application No. 60/037,765, filed on Feb. 13, 1997, provisional application No. 60/037,766, filed on Feb. 13, 1997, provisional application No. 60/037,767, filed on Feb. 13, 1997, provisional application No. 60/037,768, filed on Feb. 13, 1997, provisional application No. 60/037,769, filed on Feb. 13, 1997, provisional application No. 60/037,770, filed on Feb. 13, 1997, and provisional application No. 60/038,079, filed on Mar. 6, 1997.

(51) Int. Cl.$^7$ .............................. C05G 5/00; C05D 9/00
(52) U.S. Cl. .............................. 426/654; 71/25; 71/62; 71/64.1; 71/903; 426/655; 426/807; 554/1; 554/8
(58) Field of Search .............................. 71/25, 40, 43; 426/655, 2, 654, 807; 552/545; 554/1, 8

(56) References Cited

U.S. PATENT DOCUMENTS

| | | | | |
|---|---|---|---|---|
| 2,758,122 A | * | 8/1956 | Clayton | 260/397.25 |
| 4,605,430 A | * | 8/1986 | Godrej et al. | 71/23 |
| 4,836,843 A | * | 6/1989 | Daniels | 71/25 |
| 5,156,879 A | * | 10/1992 | Evans | 426/655 |
| 5,308,372 A | * | 5/1994 | Daniels | 71/25 |
| 5,624,883 A | * | 4/1997 | Basu et al. | 504/116 |
| 5,772,722 A | * | 6/1998 | Gednalske et al. | 71/21 |

FOREIGN PATENT DOCUMENTS

| WO | 9530727 | * 11/1995 | .............. 260/412.5 |
|---|---|---|---|

\* cited by examiner

*Primary Examiner*—Wayne A. Langel
(74) *Attorney, Agent, or Firm*—Blodgett & Blodgett, P.C.

(57) ABSTRACT

The inventive developments disclosed in this application include the following features and combinations thereof: extracting oil from spent bleaching earths for animal feed; using earths and acid water as soil amendment/fertilizer; efficient extraction of substances valuable to plants, animals, and humans from plant, animal, and fish oil soap stock, especially using the "inter phase" emulsion from soap stock accumulation; use of "black paste" from oil refining as fertilizer component (nutrient source); use of inter phase from agricultural oil refining, especially refining of non-drummed oils, as animal feed; use of "oil refining by-products to fertilizers" process and/or KOH refining in conjunction with "Miscella"-type hexane refining or "Zenith" process refining; fertilizers containing silica/silicates from by-products of agricultural oil refining; use of higher-sodium oil refining by-products as fertilizer for sodium-tolerant plants; using by-products of sugar beet refining as nutrient source; agriculturally useful potassium soaps from oil refining; products of the refining of non-degummed agricultural oils having useful biocidal or other biological properties; the use, as a feed additive, of potassium soap stock from the caustic refining of agricultural oils using a potassium caustic (KOH), especially with non-drummed oils, which has unexpected advantages over the use of soap stock from sodium caustic (NaOH) refining, especially from drummed oils.

3 Claims, No Drawings

AGRICULTURAL EXTRACTION PRODUCTS AND PROCESSES

STATEMENT REGARDING FEDERALLY SPONSORED RESEARCH OR DEVELOPMENT

THIS APPLICATION CLAIMS BENEFIT OF No. 60/037,761 Feb. 13, 1997 AND CLAIMS BENEFIT OF No. 60/037,762 Feb. 13, 1997 AND CLAIMS BENEFIT OF No. 60/037,763 Feb. 13, 1997 AND CLAIMS BENEFIT OF No. 60/037,764 Feb. 13, 1997 AND CLAIMS BENEFIT OF No. 60/037,765 Feb. 13, 1997 AND CLAIMS BENEFIT OF No. 60/037,766 Feb. 13, 1997 AND CLAIMS BENEFIT OF No. 60/037,767 Feb. 13, 1997 AND CLAIMS BENEFIT OF No. 60/037,768 Feb. 13, 1997 AND CLAIMS BENEFIT OF No. 60/037,769 Feb. 13, 1997 AND CLAIMS BENEFIT OF No. 60/037,770 Feb. 13, 1997 AND CLAIMS BENEFIT OF No. 60/038,079 Mar. 06, 1997.

This invention has (or inventions have) been created without the sponsorship or funding of any federally sponsored research or development program.

BACKGROUND OF THE INVENTION

Refining of agricultural oils and other agricultural extracts results in troublesome waste products and do not produce optimum yields.

For example, bleaching earths are used after crude oils are refined with alkali and washed with water. They are used to absorb trace quantities of undesirable constituents from refined oils. Bleaching earths (clays) can be natural earths (Diatomaceous Earths) and can contain silica/silicates, or even carbon or activated carbon. They are used in approximately 1% concentrations to the crude, once-refined oil to improve refining and water washing. Attempts have been made to recover some oil. See Orth, Jr., U.S. Pat. No. 4,285,832, issued Aug. 25, 1981 which is hereby incorporated by reference.

Spent bleaching earth is a disposal problem in that it is saturated with oil and spontaneously combusts. Waste treatment amounts to paying a disposal company to take it away.

Furthermore, there are many valuable chemicals or potentially valuable chemicals which exist in the soapstocks from the caustic refining of vegetable oils, marine oils and animal fats. It would be desirable to extract them intact and efficiently.

One of the by-products of the process invented by the present applicant and described in the above references is a black paste, which would ordinarily represent a significant disposal problem.

Another disposal problem is inter phase, which is produced by the oil refining process, for animal feed. Inter phase is a mixture of oil, water and surfactants which forms at the boundary between the acid water and the acid oil. Because it represents a significant disposal problem, it is normally desirable to minimize the production of inter phase. The easiest way to do this is to start refining with degummed oil. Degummed oil is more expensive than non-degummed oil. See Dijkstra et al., U.S. Pat. No. 4,698,185, issued Oct. 6, 1987 which is hereby incorporated by reference. It would be desirable to be able to use economically use the less expensive non-degummed oil.

One of the reasons why the interphase is difficult to dispose of is that it normally contains a great deal of sodium as a result of the sodium hydroxide refining process. This interferes, to some extent, with its use and value as an animal feed containing a great deal of fat value.

Two agricultural oil refining technologies would benefit from improved yields. One technology called the "Miscella" technology uses hexane both to extract and to aid in refining the oil. The other technology, called the "Zenith" process, bubbles the crude oil through a mass of caustic to achieve refining. These technologies are described in, for example, the following publications, which are hereby incorporated by reference:

Ziegler, U.S. Pat. No. 2,670,362 (Miscella)

Suzuki et al., U.S. Pat. No. 5,166,376, issued Nov. 24, 1992 (Miscella)

Soloman, "The Zenith process and the Kaminskij method afford lower losses in refining vegetable oils", *Revue Francaise des Corps Gras* 1972, 19 (2) 107–111 (Zenith)

Kirby, U.S. Pat. No. 4,276,227, issued Jun. 30, 1981 (Zenith)

Additional background information on Miscella Refining follows. Most oilseed crushing plants in the United States utilize a solvent called hexane to remove the oil from the crushed seed (soybean, cottonseed, corn germ, etc.). The oil and hexane mixture is called miscella. Most soybean crushing plants separate the hexane from the oil prior to caustic refining. The "hexane free" oil is called crude oil.

The main difference in "miscella refining" is that the hexane remains with the oil until after the caustic refining is completed while "conventional refining" requires that the hexane be removed from the oil prior to entering the refining process.

In conventional crude oil refining the oilseed is crushed and the vegetable oil is extracted with hexane. The hexane is then removed from the mixture, leaving crude oil. A caustic (normally sodium hydroxide) is added to the crude oil. After intimate mixing, the crude oil and caustic are heated to facilitate the reaction of the caustic with the free fatty acids present in the crude oil. The fatty acids react with the caustic to form soap stock that is then separated from the refined oil by a centrifuge. The refined oil can then be further processed or pumped to storage.

Miscella refining is used extensively for refining cottonseed oil. The cottonseed crushing plant utilizes hexane to extract the oil from the crushed seed. This mixture of oil and hexane (miscella) enters the refining system where the caustic (normally sodium hydroxide) is added to the miscella. After intimate mixing the miscella and caustic soda are heated to facilitate the reaction of the caustic with the free fatty acids present in the oil. The fatty acids react with the caustic to form soap stock that is then removed from the oil by a special explosion proof centrifuge. The refined oil and hexane mixture must then be processed through an evaporator to remove any traces of the hexane. The refined oil can then be further processed or pumped to storage.

Silica/Silicates are used in oil refining to improve refining and water washing, with some resulting disposal problems.

Some oil refiners decrease the water washing needs in the refining process by the use of amorphous silica (or silicates) such as Tri-Syl in a "modified caustic refining". See for example Welsh et al., U.S. Pat. No. 5,231,201, issued Jul. 24, 1993 and Toeneboehn et al., U.S. Pat. No. 5,298,638, issued Mar. 29, 1994, both of which are hereby incorporated by reference.

As an example, after the oil is refined it is put in a holding tank. Next, 0.4% amorphous silica is added and the oil is stirred to mix in the silica and then held. The mixture is then introduced into a filter press with bleaching earth (fuller's earth). The silica/clay remainder is a disposal problem.

There are problems raised by the high levels of sodium which could be present in various forms of oil refining fertilizer products (especially when a sodium caustic is used for refining) and the fact that most plants cannot tolerate those levels of sodium.

In refining sugar from sugar beets a waste stream of potassium sulfate is created and considered a serious problem. This material is very high in potassium and sulfur. The industry recovers sucrose from the raw sugar solution via ion exchange techniques. Sulfuric acid is employed as the ion exchanger vehicle. When the sucrose has been "extracted" by this technique the beet molasses left over is termed "raffinate" and is used as cattle feed. The potassium and sulfur are problems for cattle feed.

Industry would welcome an economical way to make potassium soaps. Dilute solutions of K Soaps are used as pesticides. They also have other biocidal (e.g. fungicidal and herbicidal) properties.

Agricultural oil is often drummed before refining, especially caustic refining. Natural gums in the oil have been thought to interfere with the refining process, to lower yields, and to increase problems with disposal of waste products. Therefore, drummed oil is used, despite its higher cost. Again, it would be desirable to be able to use economically use the less expensive non-drummed oil.

Soapstock from refining of agricultural oils may be directly incorporated into animal feeds. The feeds are for horses, sheep and cattle. Other feeds may use soap stock. The buyers (people) like the "aesthetics" of the feed when soap stock has been added as it imparts a "glossy" yellow color reminiscent of corn/grain (the eye appeal is strictly cosmetic to the farmer—the animals don't know the difference between feeds other than by taste) and, in the manufacture of feed "blocks", appears to act as a release agent— i.e. the feed blocks don't stick to the equipment. Up to ⅓ of all the soap stock in the US is incorporated into feeds. Changes in refining that would improve this additive would benefit the industry.

Sodium soap stock rapidly ferments and cannot be transported from refineries to feed formulators without stabilization—e.g. by adding sulfuric acid in order to partially acidulate during transport.

It should be noted that pH may have an important effect upon both soap stock integrity and, in particular, the stability of a liquid fertilizer made from the soap stock. Such plant food products have been formulated at a pH of about 6.5. It was noticed that, after sealing the pouring spout with a foil sealer, pressure was exhibited as evidenced by the convex shape of the foil sealer and the appearance of the container in general. The addition of propionic acid was considered but, instead, the pH of the formulation was lowered in another manner to about 5.0. No pressure was observed after 6 months of storage.

The problems mentioned above are obviated and the desiderata described are obtained by various aspects of the present invention.

It is, therefore, a principal object of the invention to provide improvments in agricultural/biological (plant, animal, fish) oil refining, extracts and by-products of these and other raw material refining processes, and improvements in fertilizer composition and effectiveness.

BRIEF SUMMARY OF THE INVENTION

The inventive developments disclosed in this application include the following features:

Extracting oil from spent bleaching earths for animal feed; using earths and acid water as soil amendment/fertilizer.

Efficient extraction of substances valuable to plants, animals, and humans from plant, animal, and fish oil soap stock, especially using the "inter phase" emulsion from soap stock accumulation.

Use of "black paste" from oil refining as fertilizer (nutrient source).

Use of inter phase from agricultural oil refining, especially refining of non-degummed oils, as animal feed.

Use of "oil refining by-products to fertilizers" process and/or potassium hydroxide (KOH) refining in conjunction with "Miscella"-type hexane refining or "Zenith" process refining.

Making of fertilizers containing silica/silicates from by-products of agricultural oil refining.

Use of higher-sodium oil refining by-products as fertilizer for sodium-tolerant plants.

Use of by-products of sugar beet refining as nutrient source.

Making of agriculturally useful potassium soaps from agricultural oil refining.

Extracting products of the refining of non-drummed agricultural oils having useful biocidal properties.

Use, as a feed additive, of potassium soap stock from the caustic refining of agricultural oils using a potassium caustic (KOH), especially with non-degummed oils, which has unexpected advantages over the use of soap stock from sodium caustic (NaOH) refining, especially from degummed oils.

DETAILED DESCRIPTION OF THE INVENTION

Various aspects of the invention are described in detail below.

Spent Bleaching Earth Use

Bleaching earths are used after crude oils are refined with alkali and washed with water. They are used to absorb trace quantities of undesirable constituents from refined oils. Bleaching earths (clays) can be natural earths (Diatomaceous Earths) and can contain silica/silicates, or even carbon or activated carbon. They are used in approximately 1% concentrations to the crude, once-refined oil to improve refining and water washing. Attempts have been made to recover some oil. See Orth, Jr., U.S. Pat. No. 4,285,832, issued Aug. 25, 1981 which is hereby incorporated by reference.

Spent bleaching earth is a disposal problem in that it is saturated with oil and spontaneously combusts. Waste treatment amounts to paying a disposal company to take it away.

In this invention, the spent bleaching clay, which is saturated with vegetable oil, is treated with alkali to saponify the oil and then the saponified mixture treated with a strong mineral acid (HCl, $H_2SO_4$, $H_3PO_4$) or mixtures of these in order to "split" or break the soap into an oil and water phase. The mixture is then centrifugally separated into an oil for use in animal feeds (feed fat-acidulated fatty acid) and the water phase with the bleaching earth is used as a soil amendment and fertilizer. (Clays such as those used in bleaching are used in preparing suspension fertilizers. They pose no harm to the soil and act as soil conditioners.)

Silica/Silicates

The same treatment may be applied to earths containing amorphous silica or silicates.

Some oil refiners decrease the water washing needs in the refining process by the use of amorphous silica (or silicates) such as Tri-Syl in a "modified caustic refining". See for example Welsh et al., U.S. Pat. No. 5,231,201, issued Jul. 27, 1993, and Toeneboehn et al., U.S. Pat. No. 5,298,638, issued Mar. 29, 1994, both of which are hereby incorporated by reference.

As an example, after the oil is refined it is put in a holding tank. Next, 0.4% amorphous silica is added and the oil is stirred to mix in the silica and then held. The mixture is then introduced into a filter press with bleaching earth (fuller's earth). The silica/clay remainder is a disposal problem.

According to the present invention, if silica is added to the refining caustic (Na or K hydroxides or any other agent like $Na_2CO_3$—soda ash etc.) depending upon the concentration, the soap stock can be made into a gel and used as is as a plant or animal feed. Another effect is that the fertilizer (water phase from an accumulation of soap stock) with silica/silicate in it can gel preferentially, thereby making a "solid" fertilizer.

Silica as the amorphous form and/or silicates can be beneficial to plant growth-particularly when applied as a topdress to hay grasses, sugar cane (when Si may be deficient) and with rice. It can increase crop yields in the above or other plants. It appears there are no detrimental effects from silica/silicates in fertilizers when applied to crops as above.

The earths may be used several times before use on soil, may be dried, the "black mass" or "black paste" from the filtering of acid water may be added, and if potassium hydroxide (KOH) is used in the process then spent earths containing potassium (K) soaps may be used as is, as pesticides or herbicides.

Biochemicals Including Biopharmaceuticals From Plant, Animal, and Fish Oil Refining (Especially with Potassium Caustic)

Efficient extraction of substances valuable to plants, animals, and humans from plant, animal, and fish oil soap stock, especially using the "inter phase" emulsion from soapstock acidulation can be acheived according to the present invention.

There are many valuable chemicals or potentially valuable chemicals which exist in the soapstocks from the caustic refining of vegetable oils, marine oils and animal fats. See for example Johansen et al. "Low-Molecular Weight Organic Compositions of Acid Waters from Vegetable Oil Soapstocks", *JAOCS,* Vol. 73, No. 10 (1996), which is hereby incorporated by reference. This list of known "phytochemicals" is large but, by no means, exhaustive. Oryzanol is an example of a specialty chemical/pharmaceutical derived from natural sources (bran oil). Since these valuable compounds are extracted from the crushed seed or a macerated flesh of fish and animals by means of solvents like n-hexane, isopropanol or supercritical carbon dioxide, as crude vegetable, marine oils or animal fats, they must be refined for edible purposes. The refining process creates a soapstock which has become a disposal problem in its soapstock for or because of the acid water created from acidulation. Many of the valuable compounds reside in the interphase layer and they are termed "unsaponifiables". They are most often (like Oryzanol) in the chemical category of sterols and tocotrienes. The only way to cost effectively extract and concentrate these potentially very valuable compounds (some of which have medical uses), is to process the soapstock from caustic refining into fatty acids and fertilizer (acid water). The only way to get "interphase" is to acidulate soapstock. The only way to recover fatty acids and interphase from soapstocks is to be able to dispose of the acid water economically as in several aspects of the present invention. This interphase is an efficient source of concentrated compounds of value to plants, animals, and humans.

It is preferable to use potassium hydroxide as the caustic in this oil refining process. The use of potassium hydroxide for the refining step provides a less aggressive refining process and does less damage to the oil itself and to the complex chemical compounds that are normally present in the interphase. As a result, there is a higher yield of refined oil (because it is less broken down), and the complex chemicals in the interphase which have the various biological and agricultural values described above are preserved and maintained in or near their original complex state.

Besides chemicals of biological (medical) and agricultural value, chemicals useful as fuel energy sources are produced in the above process. Methyl esters (and other esters) of fatty acids, for example, can be produced from soapstock, which are valuable substitutes for more common forms of diesel fuel.

Also produced are fatty acid starting materials for polymerization (e.g., for polyesters).

Use of Black Paste from Agricultural Oil Refining

A further aspect of the invention involves use of "black paste" from oil refining as fertilizer (nutrient source). One of the by-products of the process invented by the present applicant and described in the above references is a "black paste", which would ordinarily represent a significant disposal problem. The paste forms from solids which are removed when the acid water is filtered. It has been discovered, however, that the paste has a very high fertilizer content. It appears that the paste is actually based on "meal fines" which have been exposed to all of the nutrient enrichment functions which exist in the process. This paste can form a solid, or semi-solid fertilizer or can be placed in suspension with attapulgite clay. Furthermore, this paste tends to accumulate on the filter media which is formed of diatomaceous earth. The filter media is a known soil enhancer and when the paste and filter media are mixed together, the result is a very efficient fertilizer and soil enhancer mix.

Use of Interphase from Agricultural Oil Refining

The invention also involves use of another component from agricultural oil refining, especially refining of non-degummed oils, as animal feed. This involves the utilization of the interphase, which is produced by the oil refining process, for animal feed. Interphase is a mixture of oil, water and surfactants which forms at the boundary between the acid water and the acid oil. Because it represents a significant disposal problem, it is normally desirable to minimize the production of interphase. The easiest way to do this is to start refining with degummed oil. Degummed oil is more expensive than non-degummed oil. See Dijkstra et al., U.S. Pat. No. 4,698,185, mentioned above.

One of the reasons why the interphase is difficult to dispose of is that it normally contains a great deal of sodium as a result of the sodium hydroxide refining process. This interferes, to some extent, with its use and value as an animal feed containing a great deal of fat value. It has been discovered that, as a result of the process invented by the present applicant (especially the use of KOH as refining caustic) and described in the above Daniels patent references, the interphase produced by the process is high in potassium and nitrogen and very low in sodium. As a result, it is of significantly enhanced value as an animal feed component. The production of increased amounts of interphase becomes a much less significant problem and allows the refineries to process non-degummed oil without any significant economic or disposal problems.

Improvements to "Miscella"-Type Hexane Extraction and "Zenith" Process in Agricultural Oil Refining The main difference between "miscella refining" and conventional refining is that the hexane remains with the oil until after the caustic refining is completed while "conventional refining" requires that the hexane is removed from the oil prior to entering the refining process. To explain further:

Conventional Crude Oil Refining: The oilseed is crushed and the vegetable oil is extracted with hexane. The hexane is then removed from the mixture, leaving crude oil. A caustic (normally sodium hydroxide) is added to the crude oil. After intimate mixing, the crude oil and caustic are heated to facilitate the reaction of the caustic with the free fatty acids present in the crude oil. The fatty acids react with the caustic to form soapstock that is then separated from the oil by a centrifuge. The refined oil can then be further processed or pumped to storage.

Miscella Refining: Miscella refining is used extensively for refining cottonseed oil. The cottonseed crushing plant utilizes hexane to extract the oil from the crushed seed. This mixture of oil and hexane (miscella) enters the refining system where the caustic (conventionally sodium hydroxide) is added to the miscella. After intimate mixing the miscella and caustic soda are heated to facilitate the reaction of the caustic with the free fatty acids present in the oil. The fatty acids react with the caustic to form soapstock that is then removed from the oil by a special explosion proof centrifuge. The refined oil and hexane mixture must then be processed through an evaporator to remove any traces of the hexane. The refined oil can then be further processed or pumped to storage.

Use of "oil refining by-products to fertizers" process and/or KOH refining in conjunction with "Miscella"-type hexane refining or "Zenith" process refining is another aspect of the invention. This involves the use of the potassium and fertilizer oil refining concepts described in the above "Daniels" patent references in combination with two other refining technologies. One technology called the "Miscella" technology uses hexane both to extract and aid in refining the oil. The other technology called the "Zenith" process bubbles the crude oil through a mass of caustic to achieve refining. The invention involves modifying the above processes, as described in the Daniels references; to render the by-products or waste stream usable as a fertilizer or nutrient source. The invention also involves using potassium hydroxide as caustic to improve the processes and enhance the value of the by-products/waste stream.

Silica/Silicated in Fertilizer from Agricultural Oil Refining

The invention involves fertilizers containing silica/silicates from by-products of agricultural oil refining. Silica/Silicates are used in oil refining to improve refining and water washing. Some oil refiners decrease the water washing needs in the refining process by the use of amorphous silica (or silicates) such as Tri-Syl in a "modified caustic refining". See for example Welsh et al., U.S. Pat. No. 5,231,201, issued Jul. 24, 1993 and Toeneboehn et al., U.S. Pat. No. 5,298,638, issued Mar. 29, 1994, both of which are hereby incorporated by reference.

As an example, after the oil is refined it is put in a holding tank. Next, 0.4% amorphous silica is added and the oil is stirred to mix in the silica and then held. The mixture is then introduced into a filter press with bleaching earth (Fuller's earth). According to the present invention, if silica is added to the refining caustic (Na or K hydroxides or any other agent like $Na_2CO_3$—soda ash etc.) depending upon the concentration, the soapstock can be made into a gel and used as is as a plant or animal feed. Another effect is that the fertilizer (water phase from an acidulation or soapstock) with silica/silicate in it can gel preferentially thereby making a "solid" fertilizer. The silica and/or silicates appear in fertilizer made from the refining by-products. Silica as the amorphous form and/or silicates can be beneficial to plant growth, particularly when applied as a topdress to hay grasses, sugar cane (when Si may be deficient), and with rice. It can increase crop yields in the above or other plants. It appears there are no detrimental effects from silica/silicates in fertilizers when applied to crops as above.

Fertilizer from Agricultural Oil Processing for Use on Sodium Tolerant Crops

The invention involves the use of higher-sodium oil refining by-products as fertilizer for sodium-tolerant plants. This concerns the problems raised by the high levels of sodium which could be present in various forms of oil refining fertilizer products (especially when a sodium caustic is used for refining) and the fact that certain plants can tolerate those levels of sodium. This fact allows use of certain less desirable product streams with high sodium values to actually have economic value as fertilizers for those sodium-tolerant plants (such as sugar beets and sugarcane.)

Improved Sugar Beet Refining

Using a by-product of sugar beet refining as nutrient source is another aspect of the invention. In refining sugar from sugar beets a waste stream of potassium sulfate is created and considered a serious problem. This material is very high in potassium and sulfur, two important plant nutrients.

The industry recovers sucrose from the raw sugar solution via ion exchange techniques. Sulfuric acid is employed as the ion exchanger vehicle. When the sucrose has been "extracted" by this technique the beet molasses left over is termed "raffinate" and is used as cattle feed. The potassium and sulfur are problems for cattle feed. The raffinate, before use in cattle feed is allowed to crystallize out a potassium sulfate salt which is approximately 42% $K_2O$ analysis. The balance is sulfur, as sulfate, with natural organic matter. This material is very similar to the material which may be crystallized out from the "acid water-to-fertilizer" process described in the "Daniels" patent references above and can be useful in like manner.

Production of Potassium Soaps for Agricultural Use

Agriculturally useful potassium soaps from oil refining are another product related to this invention. Potassium hydroxide may be used to make Potassium (K) Soaps during agricultural oil refining in the same manner as sodium hydroxide is used to make Na Soaps. Dilute solutions of K Soaps are used as pesticides. They also have other biocidal (e.g. fungicidal and herbicidal) properties.

K Soaps can be produced more cheaply via the method disclosed in the above Daniels references and this also helps solve a disposal problem faced by vegetable oil refiners. The soap can also be incorporated into a fertilizer or plant/soil amendment to make a value-added product for agriculture, horticulture and floriculture for various markets including the consumer market.

Biocidal Products from Non-Degummed Agriclutural Oil

Products of the refining of non-degummed agricultural oils having useful biocidal properties result from this invention. Agricultural oil is usually degummed before refining, especially caustic refining. Natural gums in the oil have been thought to interfere with the refining process, to lower yields, and to increase problems with disposal of waste products. Therefore, degummed oil is used, despite its higher cost.

The present invention takes advantage of the discovery that certain products (e.g., fertilizer) made from the soapstock of non-degummed oils, were resistant to fermentation during storage. Such products made with degummed oil underwent fermentation during storage.

Besides the advantage of a non-fermenting product from a less expensive raw material, the biocidal agents can be extracted, preferably from the "interphase" formed during soapstock acidulation, where they are often concentrated.

This is especially useful when caustic refining is by use of potassium hydroxide as caustic, which has less tendency to disrupt more complex organic compounds than the usual sodium hydroxide caustic.

Potassium and Non-Degummed Soapstock as Feed Additive

The use, as a feed additive, of potassium soapstock from the caustic refining of agricultural oils using a potassium caustic (KOH), especially with non-degummed oils, has unexpected advantages over the use of soapstock from sodium caustic (NaOH) refining, especially from degummed oils.

Soapstock from refining of agricultural oils may be directly incorporated into animal feeds. The feeds are for home sheep and cattle. Other feeds may use soapstock. The buyers (people) like the "aesthetics" of the feed when soapstock has been added as it imparts a "glossy" yellow color (reminiscent of corn/grain) and, in the manufacture of feed "blocks", appears to act as a release agent—i.e. the feed blocks don't stick to the equipment. Up to ⅓ of all the soapstock in the US is incorporated into feeds.

The animals don't know the difference between feeds other than by taste. The eye appeal is strictly cosmetic to the farmer. However, if the soapstock is potassium soapstock versus sodium soapstock, the potassium adds value to the feed as a valuable mineral supplement and has a selling/marketing/cost benefit to the manufacturer and in the marketplace.

Furthermore, it has been found that K soap reduces spoilage and insect infestation of the feeds.

This is also the case with feeds which incorporate "interphase" (unsaponifiables from soapstock acidulafion). The potassium content is substantial in that interphase from the process described in the incorporated references is typically 25% fatty acid and about 50% fertilizer in the soluble form.

Non-Gegummed Crude Oil

Another aspect of the present invention takes advantage of the discovery that the soapstock of non-degummed oils (and fertilizer made from such soapstock) is resistant to fermentation during storage. Such products made with degummed oil are found to undergo fermentation during storage.

Soapstocks and fertilizers made from the acid water of acidulated soapstocks have a "biocidal property". Products which were made from 100% crude soybean oil (i.e. non-degummed crude oil) soapstock, after several years, exhibited no microbial activity—i.e. fermentation/degradation. Products made from 100% degummed soybean oil soapstocks began to exhibit microbial activity very soon after being exposed to air. When they were diluted, as in the greenhouse to make stock solutions, mold growth was extensive.

This resistance to microbial activity is especially evident when caustic refining is by use of potassium hydroxide as caustic, which is believed to have less tendency to disrupt more complex compounds (some of which are microbicidal) than the usual sodium hydroxide caustic.

Upon observation, in 1997, of a potassium soapstock from a refinery trial in March 1993, the soapstock had not degraded i.e., fermented. There was no odor and no breakdown observable by the naked eye. Similarly, other samples of K soapstock from November 1995 had no odor nor any apparent breakdown by fermentation when examined in 1997.

Probably contributing to this phenomenon is the fact that salts of potassium fatty acids exhibit pesticidal activity/biocidal activity. A commercial insecticide is in fact made from potassium salts of fatty acids.

Potassium soapstock may be directly incorporated into feeds as a value-added ingredient and, because of its stability, can be expected not to degrade in storage while awaiting incorporation into feed formulations.

Sodium soapstock rapidly ferments and can't be transported from refineries to feed formulators without stabilization—e.g. by adding sulfuric acid in order to partially acidulate during transport.

It should be noted that pH may have an important effect upon both soapstock integrity and, in particular, the stability of a liquid fertilizer made from the soapstock. Such plant food products have been formulated at a pH of about 6.5. It was noticed that, after sealing the pouring spout with a foil sealer, pressure was exhibited as evidenced by the convex shape of the foil sealer and the appearance of the container in general. The addition of propionic acid was considered but, instead, the pH of the formulation was lowered in another manner to about 5.0. No pressure was observed after 6 months of storage.

Several aspects of the invention are to directly incorporate: 1. soapstock (and/or "interphase") from refining of non-degummed oils and/or 2. soapstock (and/or "interphase") from potassium caustic refining, into animal feeds as a nutrient source and/or anti-microbial or anti-insecticidal stabilizing agent.

Clearly, minor changes could be made in the form and construction of this invention without departing from its material spirit. Therefore, it is not desired to confine the invention to the exact form shown herein and described, but is desired to include all subject matter that properly comes within the scope claimed.

The invention having been thus described, what is claimed as new and desired to secure by Letters Patent is:

1. A method of reducing the spoilage of a feed additive comprising soapstock from caustic refining of agricultural oils, comprising the steps of;
   a. obtaining soapstock from agricultural oil caustic refining in which potassium hydroxide is the main caustic,
   b. storing and/or transporting the soapstock without prior acidulation for a time that would invite spoilage in a soapstock derived from agricultural oil refining in which sodium hydroxide was the main caustic, and
   c. employing said soapstock as a feed additive.

2. A method as recited in claim 1, wherein step a. further comprises obtaining said soapstock from refining of non-degummed oils.

3. A method of reducing the spoilage of a feed additive comprising soapstock from caustic refining of agricultural oils, comprising the steps of:
   a. obtaining soapstock from non-degummed agricultural oil caustic refining in which potassium hydroxide is the main caustic,
   b. storing and/or transporting the soapstock without prior acidulation for a time that would invite spoilage in a soapstock derived from agricultural oil refining in which degummed oil was used, and
   c. employing said soapstock as a feed additive.

* * * * *